(12) United States Patent
Hebert et al.

(10) Patent No.: US 9,977,114 B1
(45) Date of Patent: May 22, 2018

(54) REAL TIME OBJECT TRACKING SYSTEM

(71) Applicant: Golf Delta, Inc., Chicago, IL (US)

(72) Inventors: Mark Hebert, Chicago, IL (US); Troy Durst, Chicago, IL (US); Ketrus Collins, Chicago, IL (US); Michael Durham, Chicago, IL (US); Ruben Reyes, Chicago, IL (US)

( * ) Notice: Subject to any disclaimer, the term of this patent is extended or adjusted under 35 U.S.C. 154(b) by 503 days.

(21) Appl. No.: 14/662,637

(22) Filed: Mar. 19, 2015

Related U.S. Application Data

(60) Provisional application No. 61/955,311, filed on Mar. 19, 2014, provisional application No. 62/079,060, filed on Nov. 13, 2014.

(51) Int. Cl.
*A63B 69/36* (2006.01)
*G01S 5/06* (2006.01)
*G01S 5/02* (2010.01)

(52) U.S. Cl.
CPC .............. *G01S 5/06* (2013.01); *G01S 5/0252* (2013.01)

(58) Field of Classification Search
USPC .................................... 463/31; 473/467, 235
See application file for complete search history.

(56) References Cited

U.S. PATENT DOCUMENTS

| | | | | |
|---|---|---|---|---|
| 2007/0135243 A1* | 6/2007 | LaRue | ............... | A63B 24/0021 473/467 |
| 2009/0233735 A1* | 9/2009 | Savarese | ................ | G01S 19/19 473/407 |
| 2012/0052967 A1* | 3/2012 | Grieshaber | ........ | A63B 37/0003 473/155 |
| 2012/0058835 A1* | 3/2012 | Luciano, Jr. | ............ | G01S 19/39 473/192 |
| 2014/0183269 A1* | 7/2014 | Glaser | .................... | G06F 21/32 235/492 |
| 2015/0080142 A1* | 3/2015 | Kline | ................ | A63B 69/3658 473/221 |

* cited by examiner

*Primary Examiner* — Masud Ahmed
(74) *Attorney, Agent, or Firm* — Pearne & Gordon LLP

(57) ABSTRACT

Provided is an apparatus for tracking an object. The apparatus includes a grid including a plurality of antennae arranged to form an array of cells in which the object can be tracked, and a communication tag provided to the object to be sensed for tracking a location of the object. A receiver is operatively connected to the antennae for transmitting an interrogation signal via the antennae and receiving a signal indicative of a location of the object within the array in response to transmission of the interrogation signal. A processor unit utilizes the signal to determine useful data indicative of the location of the object in the array, and a platform presents the usable data to a user to relay information about the location of the object.

14 Claims, 12 Drawing Sheets

REAL TIME OBJECT TRACKING SYSTEM

CROSS-REFERENCE TO RELATED APPLICATIONS

This application claims the benefit of U.S. Provisional Application No. 61/955,311, filed Mar. 19, 2014, and U.S. Provisional Application No. 62/079,060, filed Nov. 13, 2014, each of which is incorporated in its entirety herein by reference.

BACKGROUND OF THE INVENTION

1. Field of the Invention

The present disclosure is directed toward a real-time object tracking method and system and, more particularly, toward a system and process that uses radio location technology to track an object on a surface associated with radio location technology.

2. Description of Related Art

Conventional systems that rely on triangulation utilize several stations receiving a radio signal to compare the power of the radio signal emitted by a transmitter to determine the location of that transmitter. At least three different stations or receivers are required to determine the location of the emitter of the radio signal. These stations or receivers receive signal strength indicator (RSSI) of the radio signal and then use the RSSI measurement to calculate the position of the emitter.

FIG. 1 illustrates how triangulation works; the "RFID" image represents a radio signal emitter, specifically a radio frequency identification tag. Images "A," "B," and "C" represent the receiver stations. The receivers send their measurements of the RSSI to the computer, which can then calculate the position of the RFID tag from the RSSI measurements of the three receivers.

RSSI based triangulation has certain limitations that cause inaccuracies in both outdoor and indoor measurements. The accuracy of triangulation is a function of certain parameters, including the strength of the signal emitter and the number of stations or receivers that measure the radio signal. Main causes of inaccuracies include:

1. The sensitivity of commercial receivers varies from one receiver to another.
2. Reflections in the radio signal beams, such as from the floor or other obstacles or objects.
3. Receivers at certain distances can be affected by destructive interferences between the direct beam and a reflected beam from the floor or any other possible reflection.
4. The radio signal emitter is not uniformly emitting across a range of 360 degrees.

For systems utilized within indoor environments, triangulation suffers from all of the above shortcomings. Furthermore, the results from RSSI-based triangulation in an indoor environment with partitions are especially erroneous. The received signal intensity depends on the types of walls, furniture, persons and other partitions encountered by the beam on its way from the emitter to the receiver. A path going through open doors, windows and so forth often arrives at the receiver with an intensity that is much higher than the direct path, despite the fact that the distance traveled by said indirect beam was much greater than the direct line.

Although manufacturers of indoor triangulation systems attempt to average their results over several readings, and calibrate the readers upon installation using special installation software, the results remain inaccurate. A window opening, or a person passing by, can move the result by several meters, despite all of these attempts to overcome the problems inherent to this method.

BRIEF SUMMARY OF THE INVENTION

According to one aspect, the subject application involves an apparatus for tracking an object. The apparatus includes a grid including a plurality of antennae arranged to form an array of cells in which the object can be tracked, and a communication tag provided to the object to be sensed for tracking a location of the object. A receiver is operatively connected to the antennae for transmitting an interrogation signal via the antennae and receiving a signal indicative of a location of the object within the array in response to transmission of the interrogation signal. A processor unit utilizes the signal to determine useful data indicative of the location of the object in the array, and a platform presents the usable data to a user to relay information about the location of the object.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
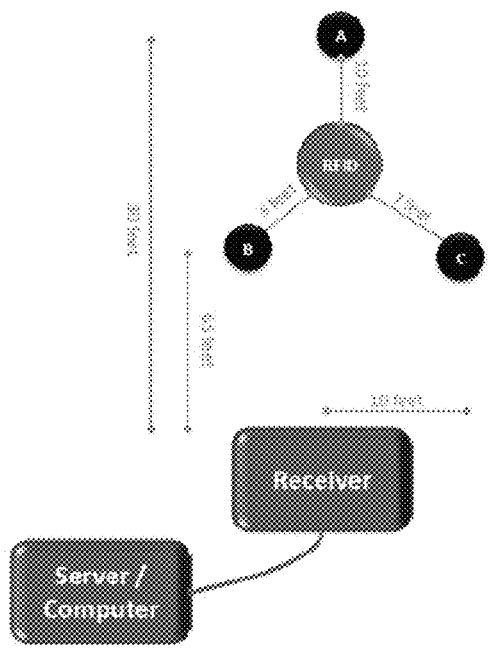
FIG. 1 schematically illustrates an object tracking arrangement utilizing triangulation.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

An embodiment of the present system and method will be described initially as a system and process that uses a location system different than triangulation to determine the location of an object. One way the present disclosure is different from triangulation is rather than relying on sensed signal strength to determine the proximity to a radio station, the present technology relies on the locations of various antennae included in an array that detect the presence of an object to determine a general location of that object. In other words, each of the antennae can be operatively connected to communicate with a Receiver and/or Processor Unit, described below, and the number and location of antennae that receive a signal from the Golf Ball as described below can be used to approximate the position of the Golf Ball. Strength of the received signal can optionally be disregarded, instead relying on a simple Yes/No analysis of whether each antenna received a signal from the Golf Ball. The technology used (e.g., passive RFID tags) can optionally have a limited useful detection range via the antennae, thereby making the approximation of the Golf Ball location reasonable without considering the strength of the sensed signal. For example, signals from intersecting antennae (e.g., using an x,y Cartesian coordinate system) can be used to determine the location of the Golf Ball on the turf 30. To clearly describe such a system and method, an entertainment system in the form of a golf driving range will be described using a location system with a field of play (in this example, a golf driving range) utilized by a plurality of players. The system of the present embodiment will be described as including at least four components:

a Golf Ball 20 (FIGS. 2A and 2B) that contain a passive radio-frequency identification tag ("Tag") 22 embedded therein, which will emit a low-power radio signal in response to being interrogated by an interrogation signal. Each of the Golf Balls 20 can optionally have a generic identifier stored by the Tag 22, or each can optionally be uniquely identified by the identifier stored by the Tag 22 (e.g., no Golf Ball 20 will have the same identifier as another Golf Ball 22 in concurrent use by the user);

an antenna array 26, interchangeably referred to herein as a Grid 26, comprising antennae 28 arranged in a pattern to receive the radio signal emitted by the Tag 22 provided to the golf ball 20. At least a portion, and optionally all of the Grid 26 can be located underneath synthetic or natural field turf 30 (FIG. 5) of the driving range 32;

one or more receivers 36 operatively connected to one or more Processor Units 38 receive the radio signals received by the antennae 28 from the Tag 22 and determine the location of the Golf Ball 20 after it lands on the turf 30 based on such radio signals, and a Gaming Platform 40 (FIG. 7), which can optionally include the Processor Unit 38 integrated therein, will act as a user interface between the Processor Unit 38 and a user of the system.

Figure 7:
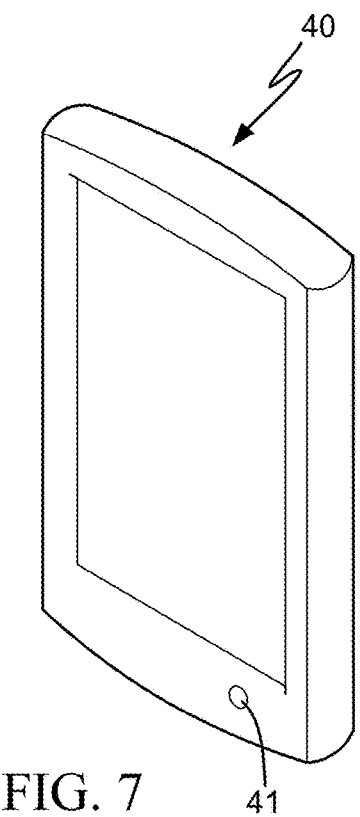
FIG. 7 shows an illustrative embodiment of a Gaming Platform.

When a user desires to play the game, the player will initiate a gaming session using the Gaming Platform 40, an example of which is shown in FIG. 7 as a tablet computer such as an iPad®, sold by Apple®, Inc. According to alternate embodiments, the user may also interface with the Gaming Platform 40 using an input peripheral (e.g., keyboard, mouse, touch-sensitive display, etc.) and/or a video display unit (e.g., television, computer monitor, projector, etc.), and/or a special software app on the user's smartphone (e.g., an iPhone® sold by Apple® Inc.). Regardless of the configuration of the Gaming Platform 40, the user will then begin playing the game, which entails the customer hitting a number of the Golf Balls 20 down the driving range 32 and onto the range turf 30 overlaying the Grid 26. As the Golf Ball 20 begins to approach the turf 30 (e.g., as the Golf Ball 20 in flight comes within ten (10 in.) inches, or within five (5 in.) inches of the surface of the turf 30, depending on the strength of the interrogation signal transmitted by the antennae 28 described in detail below) the Golf Ball 20 can be sensed and identified. Thus, identification and tracking of the Golf Ball 20 can begin as the Golf Ball 20 makes its initial approach towards the turf 30 the first time after being hit downrange from the tee area. As the Golf Ball 20 bounces and begins to roll on the turf 30, the interrogation and tracking of the Tag 22 in the Golf Ball 20 utilizing the antennae 28 continues so the path of the Golf Ball 20 along the turf 30 can be determined, and the approaching path of the Golf Ball 20 possibly extrapolated. When the Golf Ball 20 reaches its final resting place on the range turf 30, the antennae of the Grid 26 transmit the interrogation signal that induces the Tag 22 to, in return, transmit identification information that is again used to identify the Golf Ball 20. The Grid 26 will transmit the real-time location information corresponding to the location of the Golf Ball 20 (the "Raw Data") to the Processor Unit 38 via the receivers 36. The Processor Unit 38 will analyze the Raw Data to determine the impact location, path, velocity, and final location of the Golf Ball (the "Usable Data"). The Processor Unit 38 can update a cloud-based database with the Usable Data for each Golf Ball 20 hit by the user, after which the Gaming Platform 40 will retrieve the Usable Data and apply it to the game being played, such as by providing a score to the user based on the final location and positioning of the Golf Ball 20, in which a higher score is based upon a further distance traveled by the Golf Ball 20, whether the Golf Ball 20 traveled in a straight path, the proximity of the Golf Ball 20 to a target such as a cup commonly found on golf courses, etc. The Raw Data, the Usable Date or a combination thereof can be updated by the Processor Unit 38 in real time, as the Golf Ball 20 travels or, according to alternate embodiments, the Processor Unit 38 can update such data or transmit he data to the Gaming Platform 40 only after the Golf Ball 20 has come to rest at its final resting place. The various components of the entertainment system are described in further detail separately below.

The Golf Ball

Figure 2A:
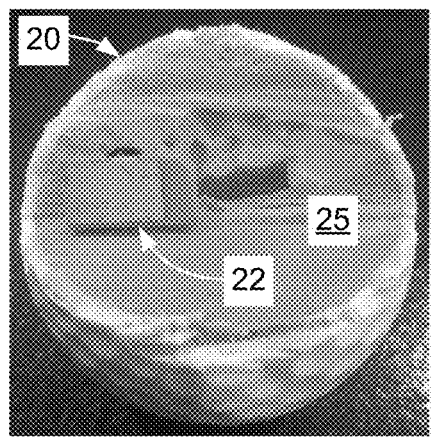
FIG. 2A is a cutaway view of a golf ball comprising an embedded Tag.

As depicted in FIG. 2A, the Golf Ball 20 includes a passive RFID chip, for example, as the Tag 22 embedded in the core 25 of the Golf Ball 20 that communicates with, and allows the Grid 26 and Processor Unit 38 to determine the Golf Ball's location (within suitable tolerance such as ±six (6 in.) inches of accuracy) in the field of play (the driving range according to the present embodiment). The Tag 22 can be disposed within a recess carved into, molded or otherwise formed in the material forming the core 25. A protective material can optionally be disposed between the Tag 22 and the core 25 material to help absorb some of the forces imparted on the Tag 22 when a golf club strikes the Golf Ball 20.

Figure 6:
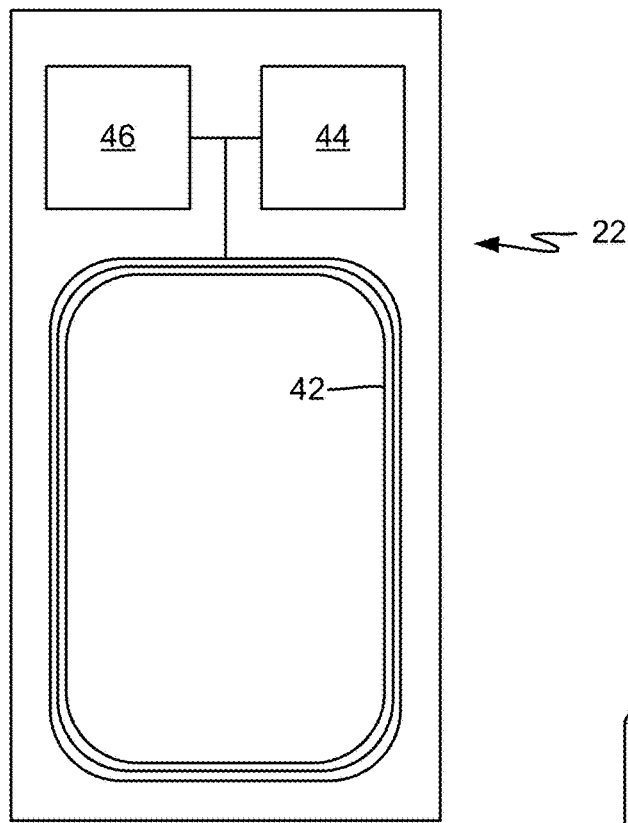
FIG. 6 shows an illustrative embodiment of a Tag in the form of a passive RFID tag.

As shown in FIG. 6, the Tag 22 can be a passive RFID tag for example. As such, the Tag 22 includes an antenna 42 formed from a strand of an electrically-conductive material wound into a loop. An electric current transmitted through the antennae 28 of the Grid 26 forms an electromagnetic field that, in turn, induces an electric current within the antenna 42. This induced current is used to temporarily energize a controller 44 that retrieves an identifier from a non-volatile computer-accessible memory 46, which is then caused to be transmitted by the controller 44 via the antenna 42 and received by the antennae 28 of the Grid 26.

Figure 2B:
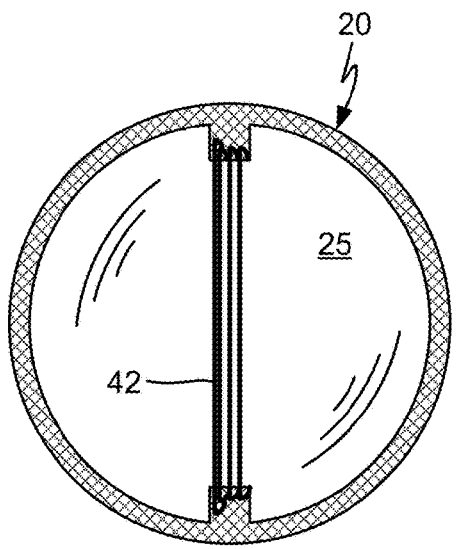
FIG. 2B is a cutaway view of a golf ball with an exterior jacket material removed, the golf ball comprising an antenna wrapped around material forming the core and located between the core material and the exterior jacket material forming the exterior surface of the golf ball.

An alternate embodiment of the Golf Ball 20 is illustrated in FIG. 2B. According to the present embodiment, the antenna 42 is wound about the core 25 between an exterior layer 29 and the core 25, within a groove 27 formed in the core 25. An optional filler material can be disposed over the antenna 42 to maintain the antenna 42 within the groove 27, and to help protect the antenna from the forces imparted thereon as a result of the Golf Ball 20 being hit. The controller 44 and memory 46 can optionally also be disposed within the groove 27, embedded within the core 25, or otherwise disposed internally within the interior of the Golf Ball 20 and operatively connected to the antenna 42.

The Grid

As mentioned above, the Grid 26 comprises a network of antennae 28 and readers 36 that utilize their location and the signal from the Tag 22 embedded in the Golf Ball 20 to determine the path the Golf Ball 20 takes to its final location. The Grid 26 is placed beneath the turf 30 of a golf driving range 21 and the Golf Balls hit downrange will land and come to rest on the turf 30 and above the Grid 26.

Figure 3:
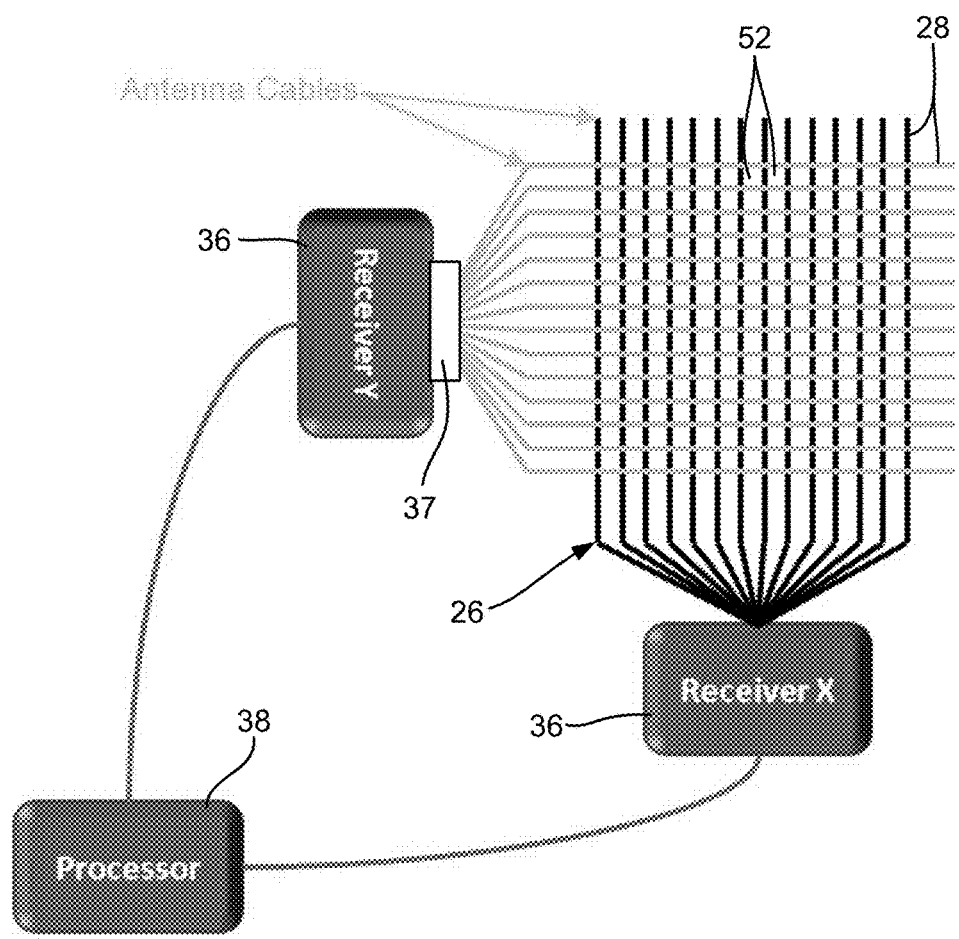
FIG. 3 is a schematic representation of a Grid of antennae arranged to receive signals from a wireless transmitter embedded within a Golf Ball to determine a location of the Golf Ball.

The Grid's antenna system is novel compared to the prior art used in triangulation methods. As depicted on FIG. 3, the Grid 26 is comprised of a series of antenna cables 28 laid perpendicular to each other, forming a grid composed of square cells. Each antenna cable 28 is connected to a receiver 36, which measures the radio signals received by the antennae 28 laid out on the X and Y axes. The receivers 36 then relay the data obtained from the antennae 28 and the receivers 36 to the Processor Unit 38. In one embodiment, a single receiver 36 can be used to receive all of the data related to the antennae 28 on a single axis. In other embodiments, multiple receivers 36 may be used to receive the data from each axis (e.g., a first receiver connected to antennae along the X axis, and a second, separate receiver connected to antennae 28 along the Y axis) as illustrated in FIG. 3. To facilitate the measurement of the location of the Golf Ball 20 with the desired accuracy, a greater number of antennae 28 than available ports on the receiver(s) 36 may be included in the Grid 26. For such embodiments, a hub 37 can optionally be operatively connected to one or a plurality of connection ports provided to the receiver 36. The hub offers more antenna ports (represented in FIG. 3 by the intersection of the antenna cables and the hub 36) than the ports of the receiver 36 occupied by the hub 37. Switching circuitry, multiplexing components or other resource sharing and/or networking components can be included as part of the hub 37 and/or receivers 36 to facilitate expanding the number of antennae 28 that can be operatively connected to the receivers 36 beyond what can be connected to the receiver 36 without the hub 37. The hub 37 is shown in FIG. 3 as being an external, add-on component to the receiver 36 labeled "RECEIVER Y", however, one or more hubs 37 can optionally be provided to one receiver 36, a plurality of, but less than all receivers 36 included in a system, or all receivers 36 included in a system. Further, the hub 37 can be an external component connected to the receiver 36, integrated into the receiver 36, or omitted from the system altogether. An example of the receiver 36, hub 37 and antennae 28 are the Speedway Revolution line of RFID readers, hubs and antennae offered by Impinj®, Inc. Although the antennae are shown along the X and Y axes in FIG. 3, alternate embodiments can utilize antennae 28 deployed in any suitable arrangement to allow an identification of the location of the Golf Ball 20 on the turf 30.

Operation of the Grid 26 is described with reference to FIG. 4, which is a simplified representation of the Grid 26 appearing in FIG. 3 with many of the antennae 28 omitted for clarity. The RFID icon 50 represents a Golf Ball 20 hit downrange that lands on the turf 30 placed on top of the Grid 26. Antennae 1Y, 2Y, 1X and 2X will receive the radio signal emitted from the Tag 22 inside the Golf Ball 20. Antennae 1X and 2X will measure the radio signal strength along the X-axis and the Processing Unit 38 will use this Raw Data to calculate that the Golf Ball 20 is located approximately forty (40 ft.) feet from the left side of the range 32 along the X-axis based on the Raw Data and the known dimensions and layout of the driving range 32. Antennae 1Y and 2Y will likewise measure the radio signal strength along the Y-axis and the Processing Unit 38 will use this Raw Data to calculate that the Golf Ball 20 is located approximately eighty (80 ft.) feet from the bottom of the driving range 32 along the Y-axis based on the Raw Data and the known dimensions and layout of the driving range 32. The Processing Unit 38 will then assign the coordinates to the Golf Ball 20 and will pass this information on to the Gaming Platform 40 so that the user may learn the location of the hit Golf Ball 20.

Figure 4:
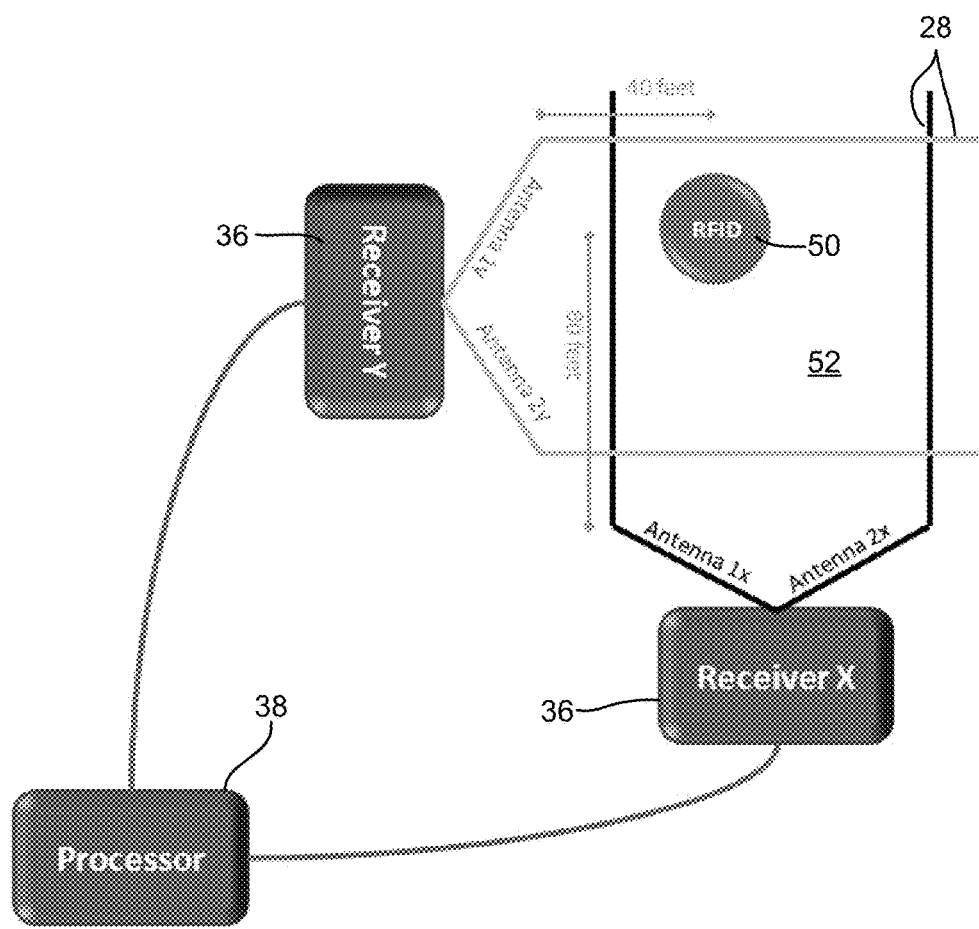
FIG. 4 is a simplified representation of the Grid appearing in FIG. 3, with many of the antennae omitted for the sake of clarity.

One should note regarding FIG. 4 that reading the signals from 4 antennae might not always be required. In cases where the Golf Ball 20 is sitting directly on one of the antennae 28, there may only be one x-axis antenna and/or one y-axis antenna 28 that receives a signal. For such embodiments, the antennae 28 may be spread further apart to ensure only one of the antennae along any given axis receives the signal indicative of the Golf Ball's location, or code may be written differently, to collect only the signal from one x-axis antenna and one y-axis antenna receiving the strongest signal, for example. Based on the signal being received by these two antennae 28, it could be assumed the Golf Ball 20 would be located within a specific cell of the grid 26.

For embodiments utilizing a Tag 22 in the form of a passive RFID tag in the Golf Ball 20, the transmitted radio signal from such a Tag 22 is relatively weak (e.g., low powered relative to an active RFID with an on-board power supply). Adding more antennae 28 to the Grid 26 will increase the number of available square or rectangular cells 52 on the Grid 26 defined by the antennae 28 (as depicted in FIGS. 3 and 4), thereby increasing the accuracy of the measurement of the Golf Ball's position despite the relatively-weak signal from the Tag 22.

Figure 13:
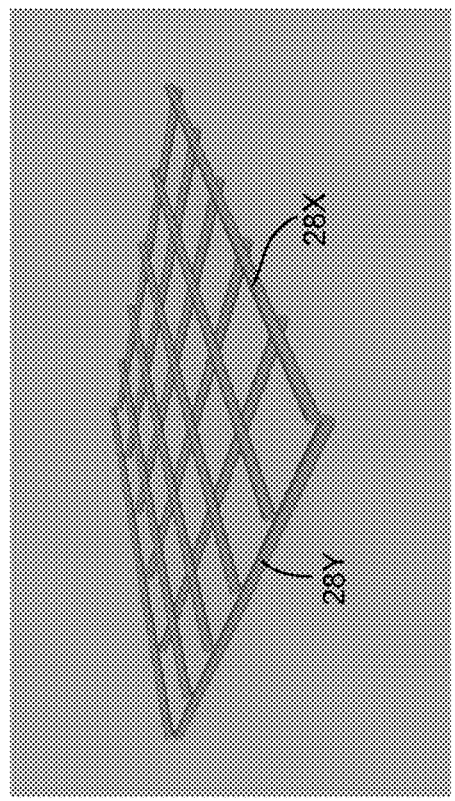
FIG. 13 shows a first arrangement of longitudinal and transverse antennae.

The antennae 28 can be arranged in any suitable arrangement (e.g., longitudinal and transverse) to establish a grid-like pattern that allows the intersections of antennae to be utilized as coordinates for identifying a spatial location of the Golf Ball 20 within the plane of the turf 30. For example, and as shown in FIG. 13, a stacked arrangement calls for the transverse antennae 28X (extending laterally, left to right across the driving range 32 in FIG. 5 in a direction substantially perpendicular to the direction Golf Balls 20 are hit) to be arranged perpendicular to, and stacked in a plane vertically above longitudinal antennae 28Y (extending longitudinally front to back along the length of the driving range 32 in FIG. 5, in a direction substantially parallel to the direction Golf Balls 20 are hit). The distance beneath the turf that each antennae 28X, 28Y is arranged can be taken into account by the Processor Unit 38 in calculating the location of the Golf Ball 20 on the turf 30.

Figure 14:
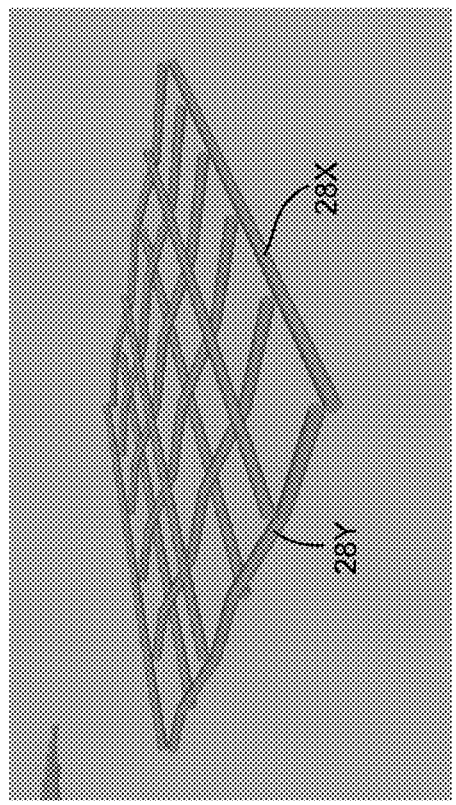
FIG. 14 shows a second arrangement of longitudinal and transverse antennae.

Another embodiment of the antennae arrangement is shown schematically in FIG. 14. As shown in FIG. 14, the transverse antennae 28X alternate between positions above and then below the longitudinal antennae 28Y. Thus, every other (e.g., even numbered) of the transverse antennae 28X are positioned at an elevation vertically above all of the longitudinal antennae 28Y, and the remaining (e.g., odd numbered) of the transverse antennae 28X are positioned at an elevation vertically below all of the longitudinal antennae 28Y. Such an arrangement improves the sensitivity of the longitudinal antennae 28Y since those antennae 28Y periodically extend into the same plane as some of the lateral antennae 28X. In other words, the longitudinal antennae 28Y are not always buried deeper beneath the turf 30 than the lateral antennae 28X.

Figure 15:
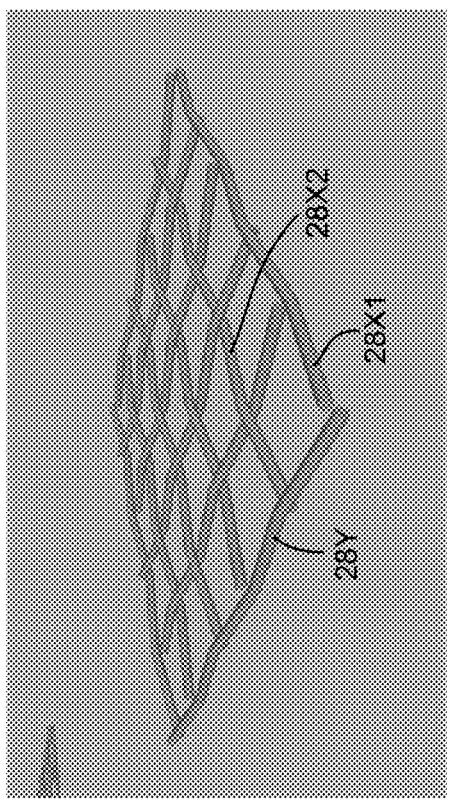
FIG. 15 shows a third arrangement of longitudinal and transverse antennae.

An improved antennae arrangement referred to as a "weaved" arrangement is shown in FIG. 15. The weave arrangement requires the lateral antennae 28X to alternate between extending over and beneath perpendicularly-arranged longitudinal antennae 28Y. The pattern of below/above a given longitudinal antennae 28Y alternates for every lateral antennae 28X. Thus, while a first lateral antenna 28X1 in FIG. 15 extends over/under/over/under/over . . . the intersecting longitudinal antennae 28Y, the second lateral antenna 28X2 extends under/over/under/over . . . the same four intersecting longitudinal antennae 28Y. Such an arrangement again offers the improvement that neither the lateral nor the longitudinal antennae 28X, 28Y is always buried deeper beneath the turf 30 than the other.

Figure 16:
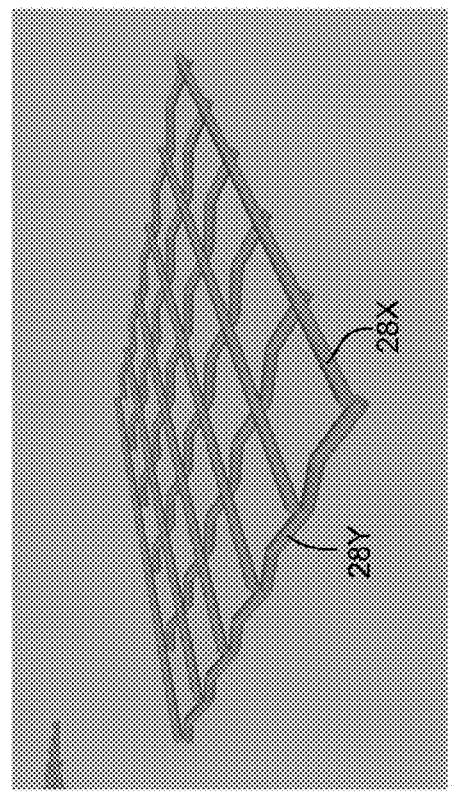
FIG. 16 shows a fourth arrangement of longitudinal and transverse antennae.

FIG. 16 shows another illustrative embodiment of a suitable antennae arrangement referred to herein as a "wave" arrangement. The wave arrangement is similar to the arrangement in FIG. 13 in that all lateral antennae 28X are arranged vertically above intersecting portions of the longitudinal antennae 28Y. Unlike the arrangement shown in FIG. 13, however, the wave arrangement calls for the longitudinal antennae 28Y to enter a space between adjacent lateral antennae 28X. Thus, portions of both the lateral and longitudinal antennae 28X, 28Y are arranged within the same vertical plane beneath the turf 30. It is believed that the weave arrangement and the wave arrangement are preferred to the arrangements shown in FIGS. 13 and 14.

The Grid 26 may also include support material to house the antennae 28 (or at least separate the antennae 28 from environmental conditions such as moisture, for example) and any other required electronics, and to provide support for, and protect the antennae 28 from golf carts or persons walking on the turf 30.

The Processor Unit

The Processor Unit 38 is a computing system comprising a computer processor programmed with computer-executable instructions that cause the Processor Unit 38 to analyze the Raw Data from the Grid 26 to determine the location/path of the Golf Ball 20. The Processor Unit 38 can optionally update a cloud-based database with Usable Data, which the Gaming Platform 40 can utilize to interact with the Customer and allow games to be played, optionally against a computer-generated avatar or another person utilizing a similar Gaming Platform 40 remotely connected to the user via a communication network (e.g., a wide area network such as the Internet, a local area network, or a combination thereof). The Processor Unit 38 may send the data directly to the Gaming Platform 40, optionally to a software app on the user's smartphone, for example. The Processor Unit 38 can be provided to a network-connected server, that serves content over a communication network to the Gaming Platform 40, or can be provided locally to the Gaming Platform 40 being utilized by the user to participate in the activity.

The user will interact with the system using the Gaming Platform 40. The Gaming Platform 40 may comprise a mobile tablet device ("Tablet"), a smartphone, a local computer, etc. Through an installed custom-made application ("Gaming Application"), the Gaming Platform 40 will obtain details on the Golf Ball's location from the Processor Unit 38 or the cloud-based database the Processor Unit 38 updates. The combination of the Tablet and Gaming Application make up the Gaming Platform 40 according to the present embodiment for purposes of clearly describing the present system and method.

The Gaming Platform 40 may also be configured to interface with a user's smartphone, allowing the user to import data and statistics pertinent to his/her playing history, such as best games played, longest drives, other statistics pertinent to the user's golfing ability, etc. This data can be used by a smartphone application to assist the user with "real life" golf games, such as suggesting which type of club a user should use during a specific point during a golf game, where such suggestions are based upon the data the smartphone app receives from the Gaming Platform 40 or from the database updated by the Gaming Platform 40. Furthermore, the data could be used by golf pros to assist users with their golf game. For instance, the layout of an actual golf course can be programmed into the user's smartphone. Using a GPS (global positioning system) data or other location information received by the smartphone, the user's location at any moment can be identified by the smartphone. Based on the imported data and statistics transmitted by the Gaming Platform 40 as a result of the user's interaction with the system, the smartphone can recommend a club length for a particular distance remaining to the hole, for example.

An optional component of the Gaming Platform 40 is a computer-readable code reader 41 (e.g., barcode reader, RFID reader, etc.) to be used in the "tee" area of the driving range 32. Such a reader 41 (FIG. 7) could read barcodes, RFID tags placed into a user's golf clubs so that the reader 41—and subsequently the Gaming Platform 40—would be able to record which Golf Balls 20 a user hit with which clubs. This information could be used by the Gaming Platform 40 to improve a user's subsequent golf game, such as by displaying information related to how far a user can hit a golf ball with a certain club on the user's smartphone during real-life golf play on an actual golf course. This option could also be used to test new golfing equipment and to compare the results of the new equipment with the user's existing equipment and also to test different hitting styles. According to alternate embodiments, a touch-sensitive display 45 of the Gaming Platform 40 could optionally allow the user to manually enter the identity of golf clubs into the system to be stored in association with the data generated by sensing the location of the Golf Ball on the turf 30 utilizing the present system.

The Gaming Platform 40 may also be configured to allow additional optional services or functions. The Gaming Platform 40 may be configured to allow the user to place electronic orders for food, beverages or other services provided by the center that hosts the present system (e.g., the driving range 32). The Gaming Platform 40 may also be configured to interface with wearable computing devices, such as "Google Glass," to provide statistics, information, and suggestions related to the user's performance or to the field of play while playing a game.

Games Played Using the System

Figure 5:
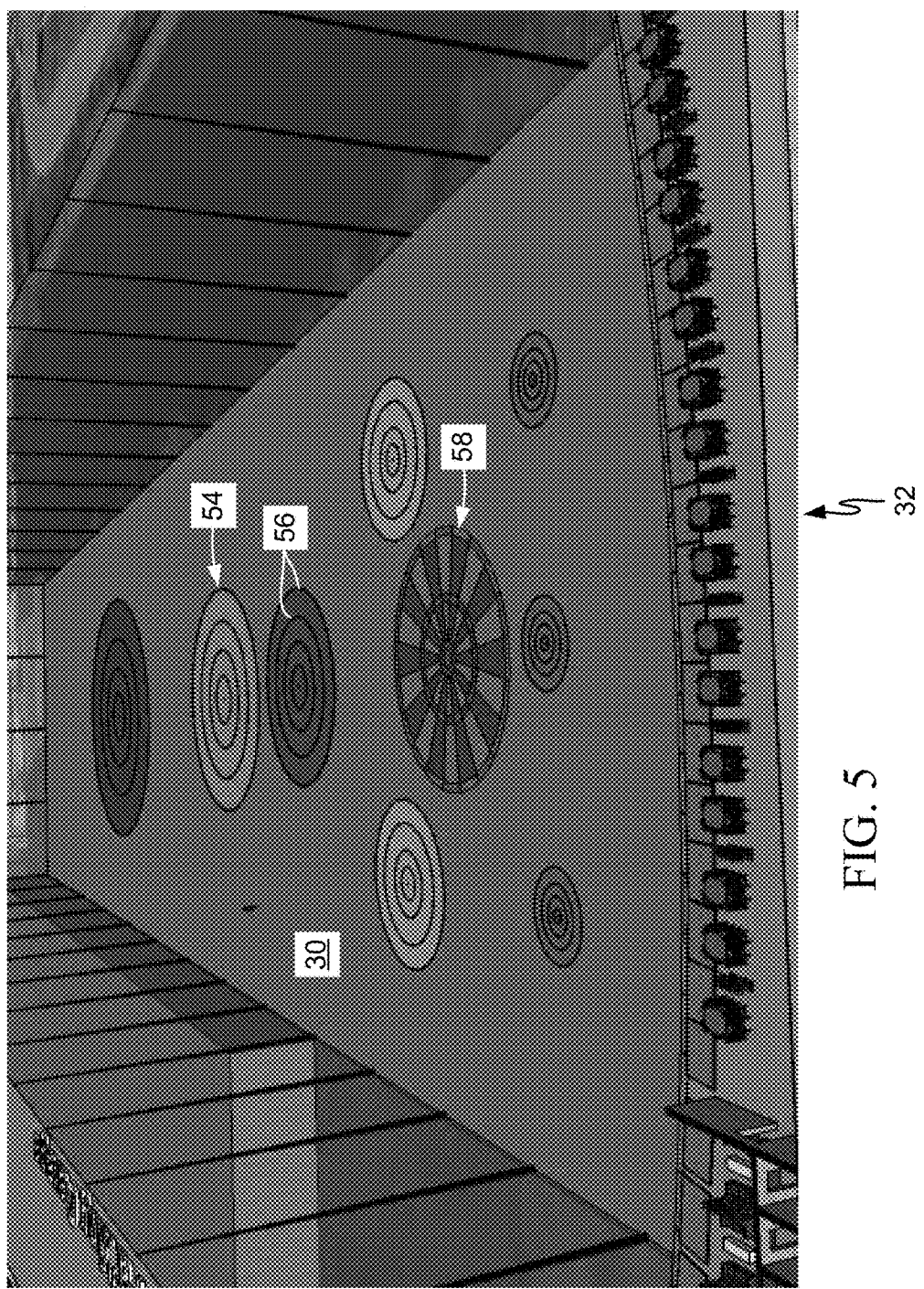
FIG. 5 shows an illustrative embodiment of a driving range comprising turf overlaying an antenna Grid.

FIG. 5 shows an illustrative embodiment of a driving range 32 comprising turf 30 overlaying an antenna Grid 26. As depicted in FIG. 5, the playing area has been modified from a generic golf driving range 32 to include targets (referred to generically at 54) (e.g., graphical images such as concentric rings 56 appearing on an observable surface of the turf 30, pins or flags indicating the location of holes, a dartboard 58, etc.). One or more of the targets 54 may be used when playing various games, examples of which are described below:

1. Longest Drive—Users will be awarded points based on the distance they hit the Golf Ball 20 and optionally how straight/on-target the Golf Ball 20 hit is. Each player may use a specific number of Golf Balls 20 or "strokes" per game. This game can have differences in difficulty applied on an individual basis so one user can play on "Hard" and compete against someone on "Easy." The roll of the Golf Ball 20 and/or bounces of the Golf Ball over the turf 30 after landing the first time as sensed by the Grid 26 can be utilized to judge the straightness of the Golf Ball's flight.

2. Closest to the Pin—Users will take turns trying to get their Golf Ball closest to a specific pin or other target 54. The users are allowed to customize this game in several ways utilizing the Gaming Platform 40. They can choose the sequence of targets 54 to aim for and how points are obtained. Points could either be obtained by getting closer to the target 54 than the other users at the end of each round (or two, four or five rounds) with fewer points to the remaining users (or no points depending on preference). Additionally, users may choose to aggregate their distances from the pins and the lowest score wins. For example, Joe's Golf Balls are 10 ft., 22 ft. and 8 ft. from the pins on his first three strokes, producing a score of 40. Sydney's Golf Balls come to rest 15 ft., 7 ft. and 13 ft. from the pins on her first three strokes. Although Sydney would have only been closer on one round, she is rewarded by being consistently closer and is currently winning with 35 points. Each game will use twenty Golf Balls 20 or "strokes" per person (i.e., each player hits 20 Golf Balls 20).

3. Darts—As shown in FIG. 5, the turf 30 may include a "dartboard" 58 that could be used to play various games such as cricket and x01 (301, 501, etc.) in a manner analogous to the manner in which those games are conventionally played using throwing darts.

4. Interactive Virtual Golf ("GD Round")—Similar to indoor golf simulators, users will play a round of golf on a virtual golf course, based on actual courses such as Augusta and Pebble Beach. However, the flight path and final location of the balls are real. The user will have the option to play three, nine, 18 or 27 holes individually or against others in his/her bay, neighboring bays at the facility or users at other facilities utilizing the present system worldwide. For an additional cost, the user can compete in tournaments to win prizes in the form of cash or other rewards.

Although the present system is described above for use in tracking a Golf Ball 20, the present disclosure may be adapted for with other sports, such as baseball, bocce ball, soccer, as well as other industries used for tracking the location of objects or people on an X,Y or X, Y, Z axis. For example, a football may be modified with the insertion of a Tag 22 in the football, such as with the aforementioned Golf Ball 20, and the football used on the playing area of the Grid. This system would allow persons to measure how far they can throw the football and keep track of improvements to their performance over time or over a training regimen. The system may be combined with Doppler radar technology or other methods and technologies that are used to determine/estimate the path of the Golf Ball 20 in the air.

An alternate embodiment of the present technology is directed toward a system and process that uses the location system other than triangulation to determine and track the location of a vehicle and use the determined location to, among other benefits, improve safety and provide useful feedback to drivers, authorities, safety personnel and toll collection entities.

Instead of a Golf Ball 20, the system of the present disclosure is directed primarily toward the Tag 22 (e.g., radio frequency identification RFID tag) provided, either permanently or temporarily, to a motor vehicle and a tracking system that communicates with the Tag 22 provided to the motor vehicle, while in motion, while stationary, or both while in motion and while stationary. Similar to the above embodiments described with respect to the Golf Ball 20, the tracking system includes a Grid 126 and a controller that is interchangeably referred to herein and in the figures as a Reader 136. Analogously to the Reader 36 above, the Reader 136 receives signals from the Grid 126 comprising a plurality of antennae 128 (FIG. 8) arranged in an array that has communicated with a compatible antenna provided to the RFID tag provided to the motor vehicle. Further, instead of the turf 30, the present embodiment will be described with reference to a roadway surface 130 on which the motor vehicle travels. Such a roadway surface 130 can optionally be formed from reinforced concrete, asphalt or other material reinforced with "rebar", reinforcing wire or other reinforcement 137.

Different illustrative embodiments of the antenna 128 configurations have the ability to provide different data points and benefits, depending on the desired use. Some illustrative embodiments are shown and described below, with a few of the many possible data points and benefits. Each of these examples is based on a toll road with 4 lanes (in each direction; only one direction illustrated), but could be applied to any number of lanes on any type of thoroughfare.

Figure 8:
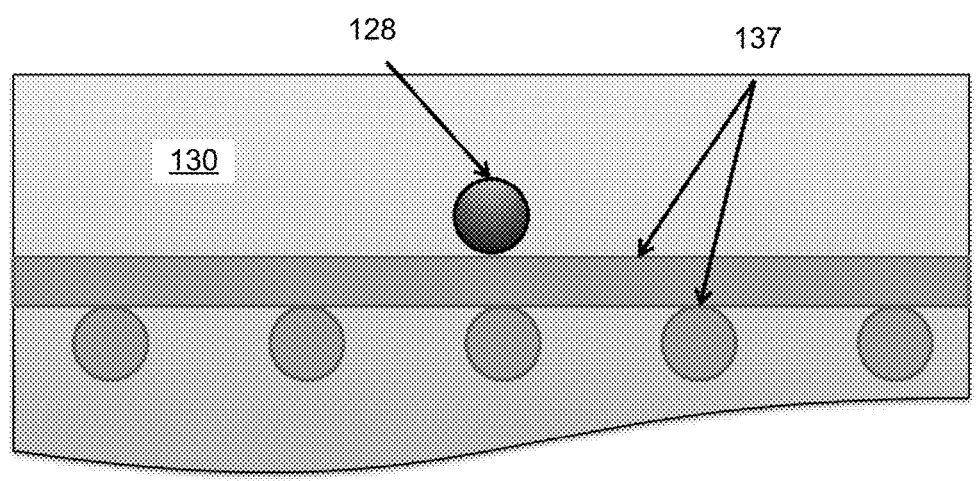
FIG. 8 is a partially cutaway view of a reinforced roadway surface comprising an antenna included in a Grid.

In each of the following embodiments, the antennae 128 will be installed in the roadway material 130 such as a layer of concrete, asphalt or other material encapsulating the antennae, as schematically illustrated in FIG. 8. However, according to alternate embodiments, one, a plurality or all of the antennae can be installed within or along a center median dividing lanes of traffic traveling in opposite directions, suspended from suspended from structures arranged along a roadway, placed on top of the roadway material 130, etc. without departing from the scope of the present invention. Aside from the antennae 128, the other materials in the diagram are not necessarily required for the system to function, and are shown as being commonly found in roadway constructions.

Illustrative Configuration A—Linear Antennae

Figure 9:
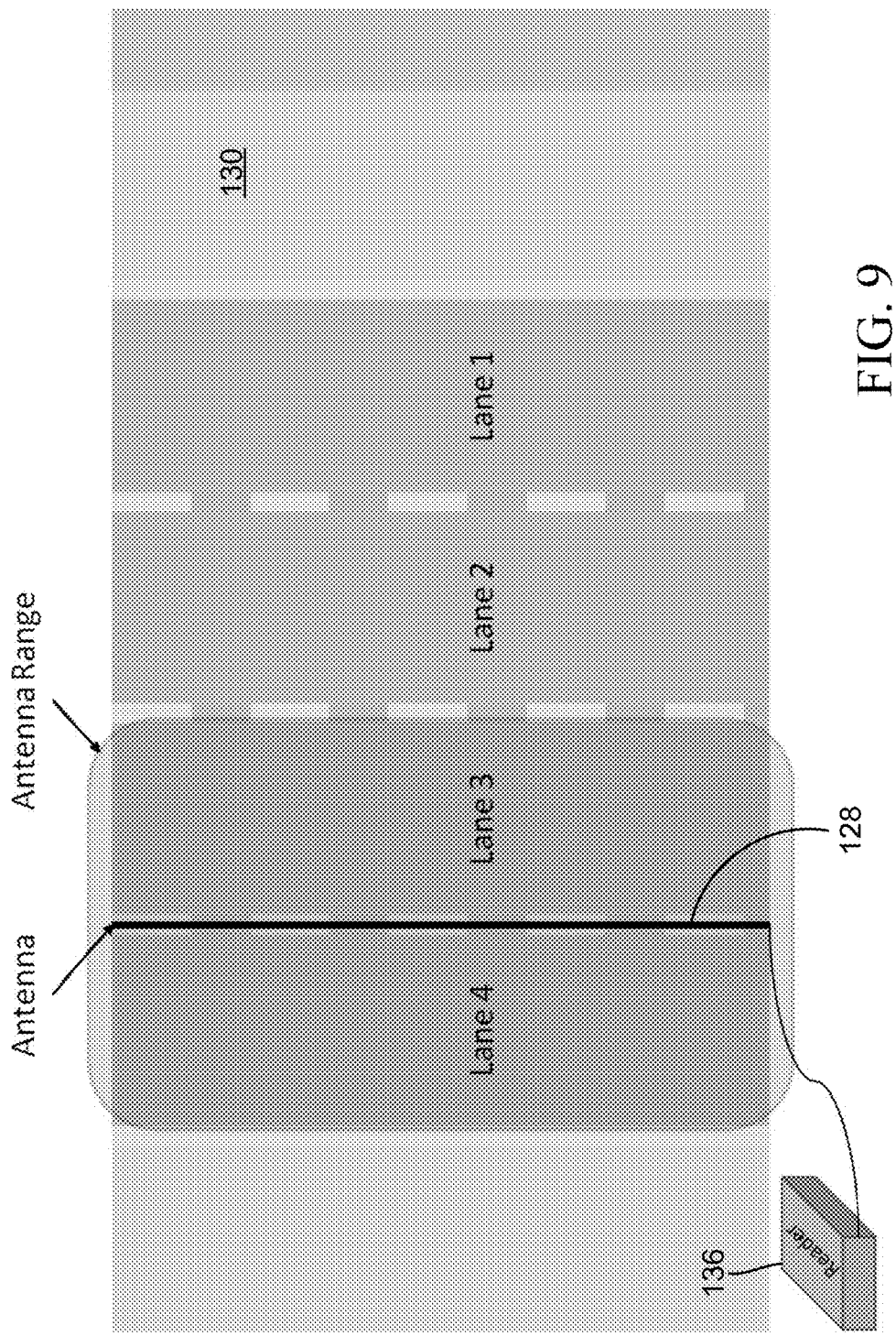
FIG. 9 shows an illustrative configuration of an antenna Grid for tracking vehicle speed.

As shown in FIG. 9, a Grid 126 utilizing an array of linearly-arranged antennae 128 is installed along the roadway surface parallel with, and optionally coaxially with a center line dividing two lanes of travel. This represents a simple embodiment where the vehicle equipped with the RFID tag travels along the length of the antenna. Although a single antenna 128 is shown, a similar antenna could also be arranged to extend along the centerline separating Lane 1 from Lane 2. The antenna 128 has a limited effective length (e.g., approximately 300-1,000 ft.), so for each of the longitudinally-extending antennae described in the illustrative configurations, an additional antenna would be installed in linear alignment with the antenna shown in FIG. 3 every 300-1,000 ft, for example, or other known distance longitudinally along the roadway 130, and optionally spaced apart from each other a known distance. As the motor vehicle travels along the road, a signal from the Tag 22 attached to that vehicle is received by each antenna 128 within range. Based on this signal, which is received by the reader 136, the known distance separating the antennas 128 arranged along the same stretch of roadway 130 (e.g., one end separated approximately 300-1,000 ft. from the end of another antenna 128 along the same centerline) programmed into a non-transitory, computer-readable memory, along with the duration that the signal is detected, the approximate speed of the vehicle can be determined by the receiver 136 and/or a Processor Unit 38 such as that described above. Alternately, the duration for which the Tag 22 is sensed by a given antenna 128 can also be used to calculate the speed of the motor vehicle and position of the motor vehicle along the antenna 128. For instance, the length of the antenna 128 can be divided by the time that the Tag is sensed by the antenna 128 and the units converted to estimate the speed of the vehicle in miles per hour or other desired unit of measurement.

Further, the system can optionally utilize directional features to determine whether the vehicle is traveling in lane 3 or lane 4 based on the signal from the Tag 22. For example, the Tag 22 may have a standardized position on the motor vehicle (e.g., under the passenger seat), meaning that the signal strength would likely be stronger from the Tag 22 while the vehicle is traveling in lane 4 (in the upward direction in FIG. 3) than the signal strength received if the vehicle was traveling in lane 3 (also in the upward direction in FIG. 3).

Therefore, the system could determine the section of the road 130 the vehicle was in, and in which lane, but the margin of error for actual location would be limited to approximately 300-1,000 ft, which is the spacing of the antennae 128. Other information that can be determined includes, but is not limited to: average speed of a vehicle with limited accuracy, the time spent in Lanes 3 & 4, and the distance traveled in Lanes 3 & 4, with accuracy by the spacing of the antennae 128.

Illustrative Configuration B—Multiple Linear Antennae

Figure 10:
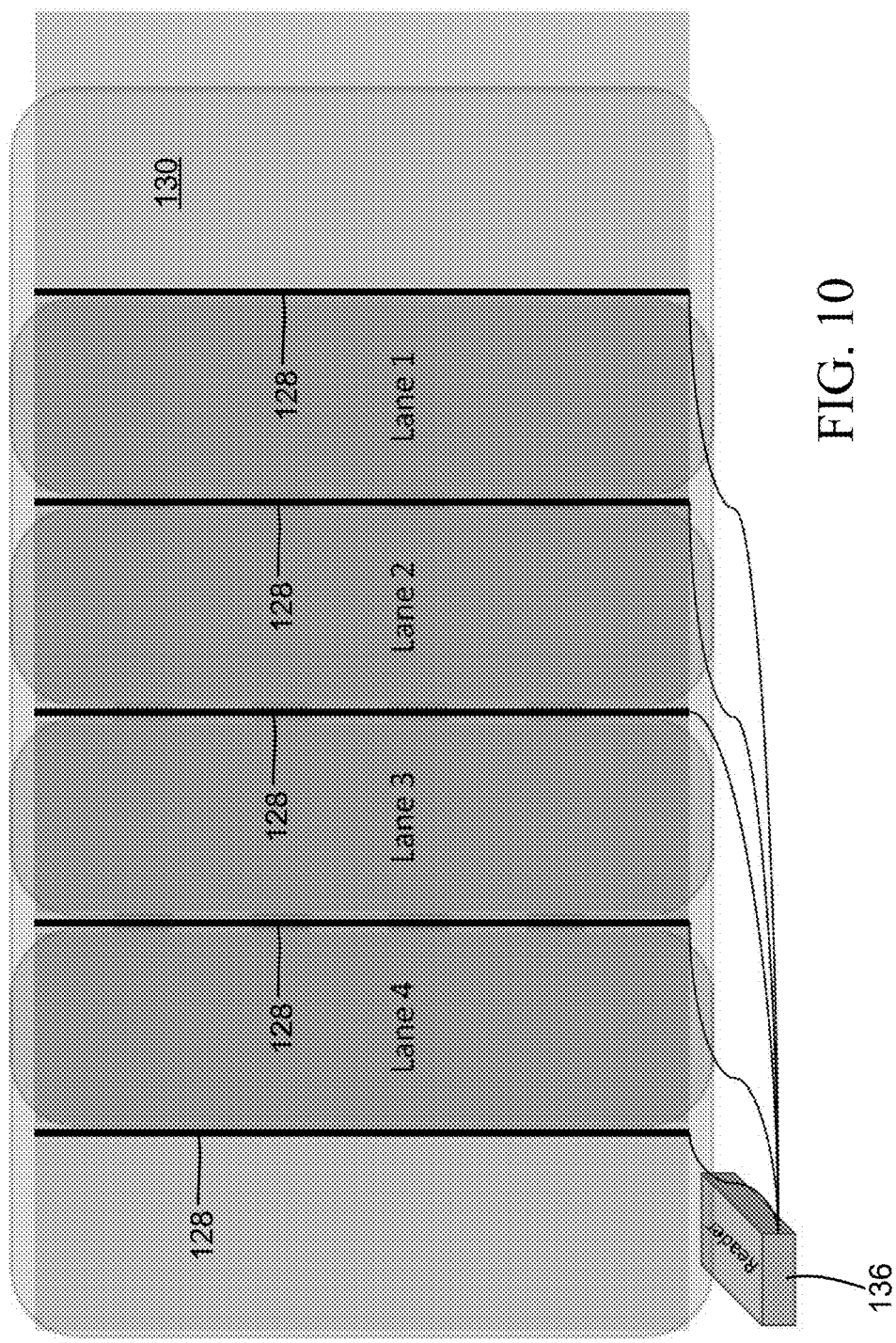
FIG. 10 shows another illustrative configuration of an antenna Grid for tracking vehicle speed.

Illustrative Configuration B is similar to Configuration A, but includes a linear antenna 128 arranged along the centerline separating each lane, and an antenna on both lateral sides of the road surface 130 as shown in FIG. 10. Utilizing the plurality of antennae 128 to collect data points in the manner described above for Configuration A allows for a more detailed and accurate calculation of attributes than in Configuration A, such as:

Average speed of a Vehicle (and group of Vehicles) with greater accuracy than Configuration A in view of the ability to track the vehicle's travel in lanes other than Lanes 3 and 4;

Time spent in each lane based on the time required by the motor vehicle with the Tag 22 to travel between linearly-aligned antennae 128;

Distance traveled in each lane with limited accuracy;

Number and frequency of times Vehicle changed between each lane;

Number of Vehicles provided with a Tag in each section of the road;

Average usage of each section and lane of the road;

Vehicle(s) with a Tag on the shoulder;

Vehicle(s) with a Tag that left the road at a designated exit, or non-designated exit location (likely the result of an accident or stoppage of the vehicle on the side of the road 130) in response of a failure of the vehicle to travel to the next linearly-aligned antenna 128;

If an obstruction may be in the road and which lane it is in by tracking the flow of traffic around a particular point along the road 130;

Vehicle(s) stopped in the middle of the road and which lane they are in; and

Which Vehicles were in a specific section at a specific time (Could provide list of possible witnesses or Vehicles involved in an accident if the Tag 22 is configured to store information that uniquely identifying the vehicles and this information can be linked to the owner/driver).

Illustrative Configuration C—Transversely Extending Antennae

Figure 11:
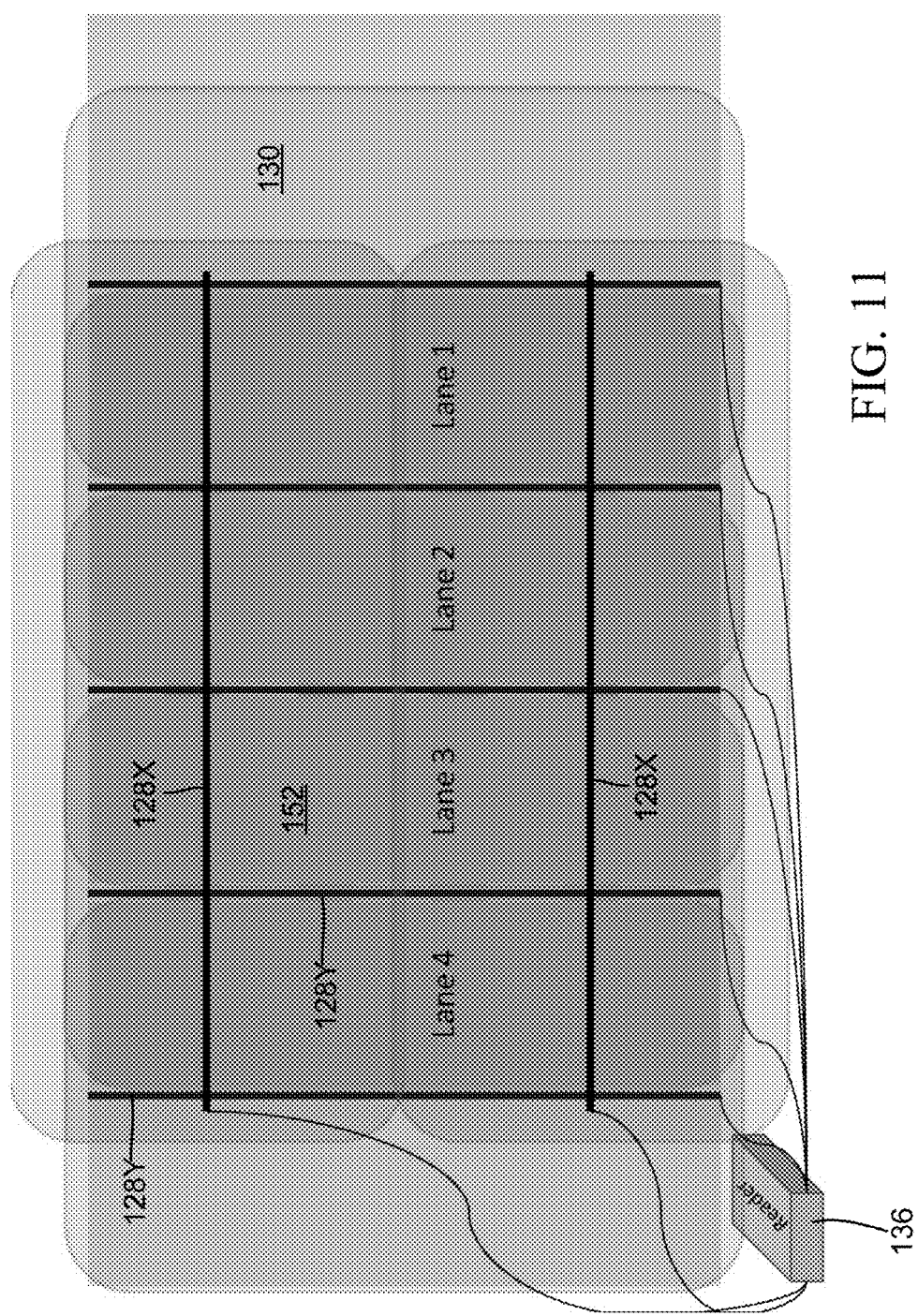
FIG. 11 shows another illustrative embodiment of an antenna Grid including both longitudinally-extending antennae and transversely-extending antennae.

Illustrative Configuration C is similar to Configuration B, including a linear antenna 128Y arranged along the centerline separating each lane and on both lateral sides of the road surface 130. But as shown in FIG. 11, Configuration C also includes a plurality of transversely-extending antennas 128X that cross all four lanes in a widthwise direction (perpendicular to the longitudinal direction of the road 130 along which motor vehicles travel), and periodically read the Tag 22 as the motor vehicle travels along the road 130. The inclusion of the transversely-extending antennae 128X separated by known distances allows for a more-accurate determination of the vehicle position and speed along the road 130 relative to the above configurations, again resulting in the formation of rectangular or square cells 152 defined by the antennae 128X and 128Y.

In addition to the Configuration B data, Configuration C can also be utilized to allow the reader 136 to determine:

Accurate speed of a Vehicle at each point along their trip by calculating the time required for the Tag 22 (and accordingly the motor vehicle) to travel the distance separating known transversely-extending antennae 128X;

Distance traveled in each lane with detailed accuracy by detecting the lane in which the Tag 22 is traveling using the antennae 128Y and the distance using the antennae 128X;

If an obstruction may be in the road and which lane it is in with greater accuracy than Configuration B (e.g., determining the particular cell(s) 152 in which traffic is stopped or are being avoided altogether);

Vehicle(s) are stopped in the middle of the road and which lane they are in with greater accuracy than Configuration B (in the event of Vehicle malfunction, it may be identified before the Vehicle comes to a complete stop within a lane utilizing data sensed by an antenna 128Y, and determining that the vehicle has passed a particular antenna 128X, but not the subsequent transverse antenna 128X);

Which Vehicles were within a specific distance of a specific point/location at a specific time (Could provide list of possible witnesses or Vehicles located in specific cells 152 at a specific time when an accident is reported with significantly greater accuracy that Configuration B and may be able to automatically determine which Vehicle was at fault. For example, vehicle A was traveling at the speed limit for an extended period of time and vehicle B was rapidly approaching from behind and weaving in and out of lanes before each of the vehicles came to rest within the same cell); and Distance between each vehicle (front to back).

Illustrative Configuration D—Longitudinal Antenna in Lane

Figure 12:
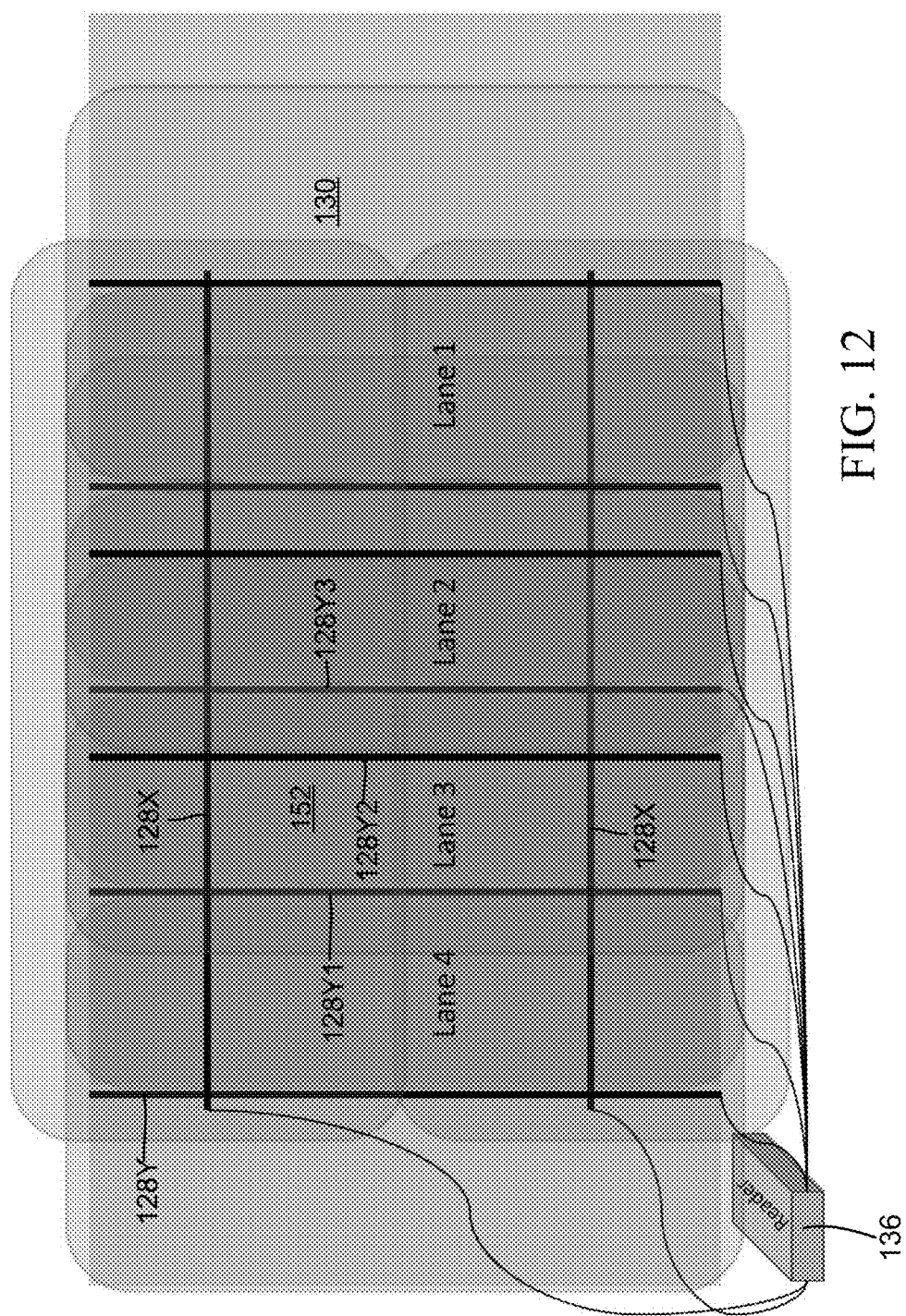
FIG. 12 shows another illustrative embodiment of an antenna Grid including antennae arranged longitudinally along centerlines and lateral sides of the road, and also within lanes 2 and 3, as well as laterally-extending antennae.

Illustrative Configuration D is similar to Configuration C, including a linear antenna 128Y arranged along the centerline separating each lane, an antenna 128Y on both lateral sides of the road surface 130, and the transversely-extending antennas 128X. Additionally, however, Configuration D also includes an antenna extending parallel to the central axis of lanes 2 and 3 to improve the accuracy of the determinations by the reader 136 of vehicle attributes in the lateral direction, as shown in FIG. 12.

For example, in addition to the capabilities described above for Configuration C, the present configuration of the antenna array allows the reader to determine, at least:

Vehicles showing repeated swerving, without necessarily changing lanes. In other words, the receiver 136 can sense when the Tag 22 bounces between opposite sides of the same lane based on the collective data from antenna 128Y1, 128Y2 and 128Y3, which is indicative of an impaired driver who is not able to maintain the vehicle within a lane;

An obstruction may be in the road and which lane it is in with greater accuracy than Configuration B; and Distance between each vehicle (left to right in addition to front to back).

With the appropriate antenna array configuration, the roadway 130 and vehicle could effectively "communicate" with each other, providing advanced warnings and allow the vehicle to essentially drive itself and be a component to enabling an automatic driving function. The present system could provide information on other Vehicles/drivers (for merging and lane changes), road conditions/obstacles ahead, lane and speed limit details as well as location based information to determine exit ramps.

At the municipal level, the present system may also be used at intersections or on certain portions of city/municipal roadways to track the location of vehicles. Some purposes/benefits may include, but are not limited to identifying witnesses and/or suspects involved in a crime, eliminating the need for high speed auto chases and determining more efficient traffic patterns.

Additionally, the present system may be used in other functions such as determining if a soccer player is offside. In Soccer, offside is determined by an invisible line that moves based on the location of the last defensive player. If an offensive player is behind a defensive player before the ball is kicked, the offensive player is offside. Since the referee is rarely in-line with the last defensive player, parallax is often a factor. Many goals have been called back because a player was penalized for being offside, when in reality the player was not. Additionally, many goals have been allowed when the offensive player was offside but was not called by the referee. The System could send an alert to the referee to indicate if a player is offside or not. In addition to the antennas and readers embedded in the field, components required would include a soccer ball with an RFID tag(s) and RFID tag(s) on each player's body/clothing to determine their location in relation to the ball and other players.

The present system may also be permanently or temporarily installed, and used to track the movement and location of people or objects in specific facilities or locations, both indoor and outdoor. A few examples would include: (i) Tracking the movement and time spent by individual attendees at each section of a convention or other organized event; (ii) Tracking and reporting the location of inventory in a warehouse; (iii) Tracking components, equipment, machinery, labor and raw materials in a manufacturing process; (iv) Tracking visitors and employees within a secure facility that may required advance security analysis; (v) Tracking the movements and coverage of employees in a retail, medical or other large service based environment; and, (vi) many others not limited to the possible applications described above.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for tracking an object, the apparatus comprising:
   a plurality of antenna cables, wherein the antenna cables form boundaries of cells in an array of cells in which the object can be tracked;
   a communication tag provided to the object to be sensed for tracking a location of the object;
   a receiver operatively connected to the antenna cables for transmitting an interrogation signal via the antenna cables and receiving a signal indicative of a location of the object within the array in response to transmission of the interrogation signal;

a processor that utilizes the signal to determine useful data indicative of the location of the object in the array; and a platform that presents the useful data to a user to relay information about the location of the object; wherein the plurality of antenna cables comprise:

at least one longitudinal antenna cable extending substantially parallel to a direction in which the object travels; and at least one transverse antenna cable extending approximately perpendicular to the direction in which the object travels, wherein the at least one longitudinal antenna cable and the at least one transverse antenna cable are arranged and spaced apart from each other to form a grid of antenna cables so as to form the array of cells in which the object can be tracked.

2. The apparatus of claim 1, wherein the object is a golf ball, the communication tag comprises a RFID tag embedded within the golf ball, and the plurality of antenna cables are buried beneath golf turf to be concealed from view.

3. The apparatus of claim 2, wherein the useful data comprises at least one of: a distance separating the golf ball from a tee area, a path traveled by the golf ball, and a distance separating the golf ball from a target.

4. The apparatus of claim 3, wherein the platform comprises a display device at a location where it can be viewed by a user in the tee area.

5. The apparatus of claim 2, wherein the useful data comprises a location of the golf ball at a final resting place on the golf turf, and the processor utilizes a protocol other than triangulation to determine the location of the golf ball.

6. The apparatus of claim 5, wherein the processor determines the location of the golf ball based on receiving an identity of the golf ball via a RFID communication from the RFID tag with intersecting antenna cables in a Cartesian coordinate system.

7. The apparatus of claim 1 further comprising a hub that expands a quantity of ports available for connecting the plurality of antenna cables to the receiver to a number that is greater than a native quantity of ports available to the receiver without the hub.

8. The apparatus of claim 1, comprising a plurality of longitudinal antenna cables and a plurality of transverse antenna cables, wherein each of the plurality of longitudinal cables are arranged in a first common vertical plane and each of the transverse antenna cables are arranged in a second common vertical plane, and wherein the first common vertical plane is different than the second common vertical plane.

9. The apparatus of claim 1, comprising a plurality of longitudinal antenna cables and a plurality of transverse antenna cables, wherein the plurality of longitudinal antenna cables are interwoven with the plurality of transverse antenna cables.

10. The apparatus of claim 1, comprising a plurality of longitudinal antenna cables and a plurality of transverse antenna cables, wherein the plurality of longitudinal and transverse antenna cables have a wave arrangement.

11. The apparatus of claim 1, wherein the object is a vehicle and each cell of the array corresponds to one lane of traffic.

12. The apparatus of claim 11, wherein the plurality of antenna cables comprise at least two longitudinal antenna cables, each of the longitudinal antenna cables extending along an edge of a lane of traffic.

13. The apparatus of claim 12, further comprising a longitudinal antenna cable extending substantially parallel to a direction in which the object travels and between edges of a lane of traffic.

14. The apparatus of claim 11, wherein the plurality of antenna cables comprise at least two longitudinal antenna cables extending substantially parallel to a direction in which the object travels and at least one transverse antenna cable extending approximately perpendicular to the direction in which the object travels.

\* \* \* \* \*